(12) United States Patent
Peters et al.

(10) Patent No.: US 7,677,667 B2
(45) Date of Patent: Mar. 16, 2010

(54) FITTING FOR A VEHICLE SEAT

(75) Inventors: Christoph Peters, Wermelskirchen (DE); Ulrich Lehmann, Alfter (DE)

(73) Assignee: KEIPER GmbH & Co. KG, Kaiserslautern (DE)

(*) Notice: Subject to any disclaimer, the term of this patent is extended or adjusted under 35 U.S.C. 154(b) by 0 days.

(21) Appl. No.: 12/286,916

(22) Filed: Oct. 3, 2008

(65) Prior Publication Data

US 2009/0085391 A1  Apr. 2, 2009

Related U.S. Application Data

(63) Continuation of application No. PCT/EP2007/001484, filed on Feb. 21, 2007.

(30) Foreign Application Priority Data

Apr. 4, 2006   (DE) .................. 10 2006 015 560

(51) Int. Cl.
*B60N 2/10* (2006.01)
*B60N 2/20* (2006.01)
*B60N 2/235* (2006.01)

(52) U.S. Cl. ................................. 297/367 R

(58) Field of Classification Search .............. 297/367, 297/367 R
See application file for complete search history.

(56) References Cited

U.S. PATENT DOCUMENTS 6,454,354 B1   9/2002  Vossmann et al.
6,722,738 B2 *  4/2004  Uramichi ................... 297/367
6,758,525 B2 *  7/2004  Uramichi ................... 297/366
7,066,541 B2 *  6/2006  Uramichi ................... 297/367
7,097,251 B2 *  8/2006  Uramichi ............... 297/367 X
7,100,987 B2 *  9/2006  Volker et al. .............. 297/367
7,261,379 B2 *  8/2007  Volker et al. .............. 297/367
7,354,109 B2 *  4/2008  Oki ............................. 297/367

(Continued)

FOREIGN PATENT DOCUMENTS

DE       199 28 148 A1    1/2001

(Continued)

OTHER PUBLICATIONS

US 6,648,413, 11/2003, Uramichi (withdrawn)

*Primary Examiner*—Rodney B White
(74) *Attorney, Agent, or Firm*—Womble Carlyle Sandridge & Rice, PLLC

(57) ABSTRACT

A fitting has a first fitting part, a second fitting part which is rotatable about an axis relative to the first fitting part, a drivable eccentric mounted rotatably about the axis, locking elements moved radially outward by the eccentric to interact with the second fitting part to lock the fitting, a disc cam which pulls the locking elements radially inwards to unlock the fitting, and a free-pivoting control element which, in a certain free-pivoting angular range corresponding to a relative angular range of the fitting parts, prevents the fitting from locking. The free-pivoting control element has at least one first stop track, and at least one second stop track which is offset axially and/or radially with respect to the first stop track. The locking elements comprise first locking elements which interact with the first stop track, and second locking elements which interact with the second stop track.

20 Claims, 3 Drawing Sheets

U.S. PATENT DOCUMENTS

| | | | |
|---|---|---|---|
| 7,571,963 B2 * | 8/2009 | Peters et al. | 297/367 R |
| 2003/0230923 A1 * | 12/2003 | Uramichi | 297/367 |
| 2005/0127732 A1 | 6/2005 | Peters | |
| 2007/0137393 A1 * | 6/2007 | Peters | 74/502.4 |
| 2008/0175658 A1 * | 7/2008 | Peters | 403/349 |
| 2008/0185892 A1 * | 8/2008 | Peters et al. | 297/362 |

FOREIGN PATENT DOCUMENTS

| | | |
|---|---|---|
| DE | 102 06 299 A1 | 8/2003 |
| DE | 102 53 054 A1 | 6/2004 |
| EP | 1 197 377 A2 | 4/2002 |

\* cited by examiner

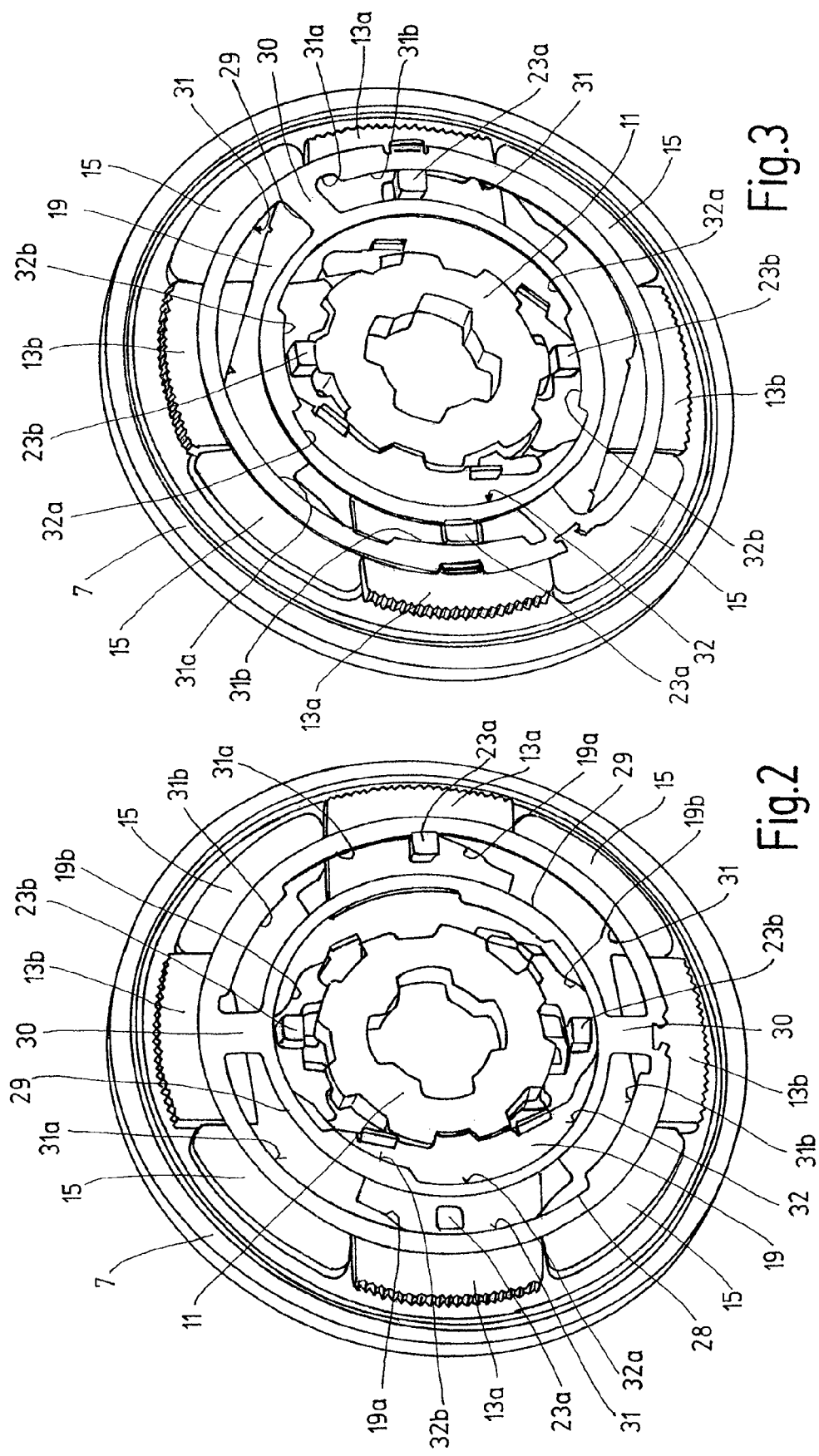

FITTING FOR A VEHICLE SEAT

CROSS-REFERENCE TO RELATED APPLICATION

The present application is a continuation of International Application PCT/EP2007/001484, which was filed Feb. 21, 2007. The entire disclosure of International Application PCT/EP2007/001484, which was filed Feb. 21, 2007, is incorporated herein by reference.

TECHNICAL FIELD

The present invention relates to a fitting for a vehicle seat, in particular a motor vehicle seat, having a first fitting part; a second fitting part which is rotatable about an axis relative to the first fitting part; a drivable eccentric mounted for rotating about the axis; at least four locking elements that are radially guided by the first fitting part, and are for being acted upon by the eccentric so that they move radially outward and interact with the second fitting part to lock the fitting; a disk cam which pulls the locking elements radially inward to unlock the fitting; and a free-pivoting control element which, in a certain free-pivoting angular range corresponding to a relative angular range of the fitting parts, prevents the fitting from locking, and which has a stop track for interaction with a locking element.

BACKGROUND

U.S. Pat. No. 6,648,413 B2 proposes a fitting of the type mentioned in the Technical Field section of this disclosure, in which the free-pivoting control element controls the engagement of exactly one locking element which, in turn, upon pivoting freely, acts upon the eccentric and blocks it in such a manner that the eccentric is unable to act upon the other locking elements. This solution permits the provision of free-pivoting angular ranges which are greater than the angular distance between two locking elements. This is advantageous in particular if there is a relatively large number of locking elements, as is the case for fittings of seats with integral belts. Because of the higher loading in these types of seats, the relatively large number of locking elements is provided to ensure that the fitting has greater strength.

BRIEF SUMMARY OF SOME ASPECTS OF THE INVENTION

An aspect of the present invention is the provision of improvements to a fitting of the type mentioned in the Technical Field section of this disclosure, with the improvements pertaining to the fitting remaining unlocked during the free-pivoting operation. In accordance with one aspect of the present invention, a fitting for a vehicle seat, in particular a motor vehicle seat, has a first fitting part; a second fitting part which is rotatable about an axis relative to the first fitting part; a drivable eccentric mounted for rotating about the axis; at least four locking elements that are radially guided by the first fitting part, and are for being acted upon by the eccentric so that they move radially outward and interact with the second fitting part to lock the fitting; a disk cam which pulls the locking elements radially inward to unlock the fitting; and a free-pivoting control element. In a certain free-pivoting angular range corresponding to a relative angular range of the fitting parts, the free-pivoting control element prevents the fitting from locking. The free-pivoting control element has at least one first stop track. The free-pivoting control element also has at least one second stop track which is offset axially and/or radially with respect to the first stop track. The locking elements comprise at least two first locking elements which interact with the at least one first stop track, and second locking elements which are each adjacent to the first locking elements and interact with the at least one second stop track.

As mentioned above, the free-pivoting control element has at least one second stop track which is offset axially and/or radially with respect to the at least one first stop track. The locking elements are divided into groups in such a manner that adjacent locking elements interact with different stop tracks. In comparison to intermerging stop tracks, in which the locking elements enter the region of the adjacent locking element during the rotation of the fitting parts over a relatively large relative angular range, in the exemplary embodiment a stop track which is twice as long is available for each locking element. Even a free-pivoting angular range greater than 360° divided by the number of locking elements can therefore be provided. In comparison to a solution with one particular locking element which, as the single locking element, is kept open and has to hold the eccentric, there are symmetrical force ratios.

To fulfill their function, the stop tracks preferably have different subregions. A first subregion does not influence the locking elements. A second subregion is of the size of the free-pivoting angular range, and prevents the locking elements from interacting with the second fitting part. In order to influence the locking elements in a simple manner, the subregions extend radially outward to differing extents while maintaining an at least approximately constant radial distance from the axis such that they can act as radial stops for the locking elements.

In order to obtain a free-pivoting control element which is as flat as possible and requires hardly any construction space, the stop tracks themselves are preferably placed radially outward to differing extents. For example, the first stop tracks can each be formed on the edge of a guide slot of the free-pivoting control element. Webs are preferably provided between the guide slots and serve as material bridges for keeping the parts of the free-pivoting control element together, and the webs can preferably at the same time limit the relative rotation of the stop parts. The second stop track can be formed on the radially inner (or outer) edge of the annular free-pivoting control element, as a result of which use is made of a contour which is already present.

The free-pivoting control element and the locking elements preferably interact by way of axially protruding lugs. These lugs are preferably the same lugs that are used for interaction with the disk cam. The various lugs on the locking elements are arranged radially outward to differing extents or protrude axially to differing extents in accordance with the offset of the stop tracks. If the stop tracks and the lugs are arranged in a different manner radially, the disk cam is matched thereto by way of corresponding control tracks.

The fitting according to the invention is preferably used in a vehicle seat, or more specifically a seat with an integral belt and with a freely pivotable backrest, for fitting the backrest to the seat part and adjusting the inclination of the backrest. But the fitting of the present invention could also be used elsewhere in the vehicle seat or in another vehicle seat.

Other aspects and advantages of the present invention will become apparent from the following.

BRIEF DESCRIPTION OF THE DRAWINGS

The invention is explained in more detail below with reference to an exemplary embodiment which is illustrated in the drawings, in which:

FIG. 2 shows a slightly perspective view of the exemplary embodiment without the second fitting part, in a use position, FIG. 3 shows a view corresponding to FIG. 2 in the free-pivoting range.

DETAILED DESCRIPTION OF EXEMPLARY EMBODIMENT

Figure 1:
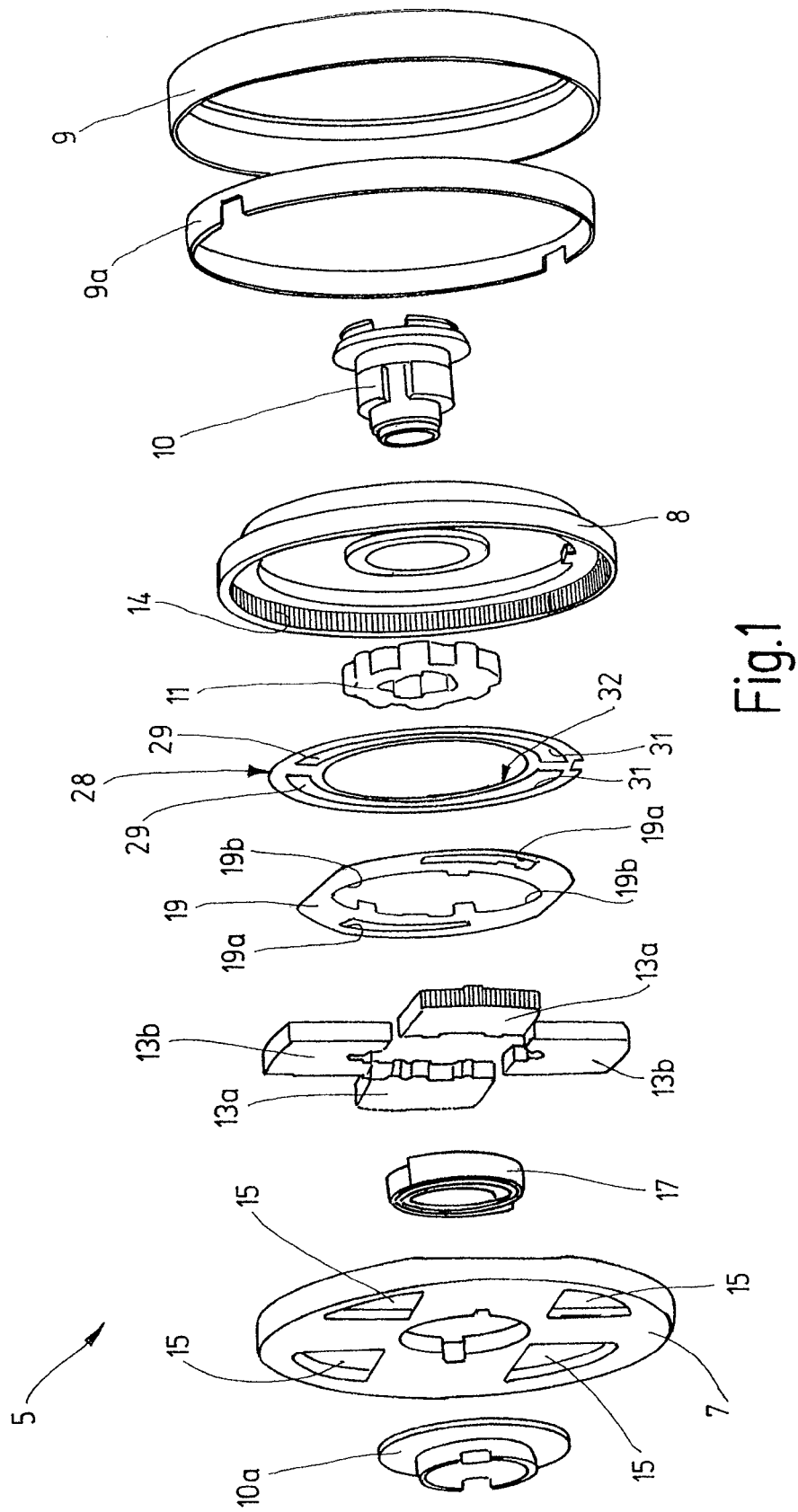
FIG. 1 shows an exploded illustration of the exemplary embodiment.
Figure 4:
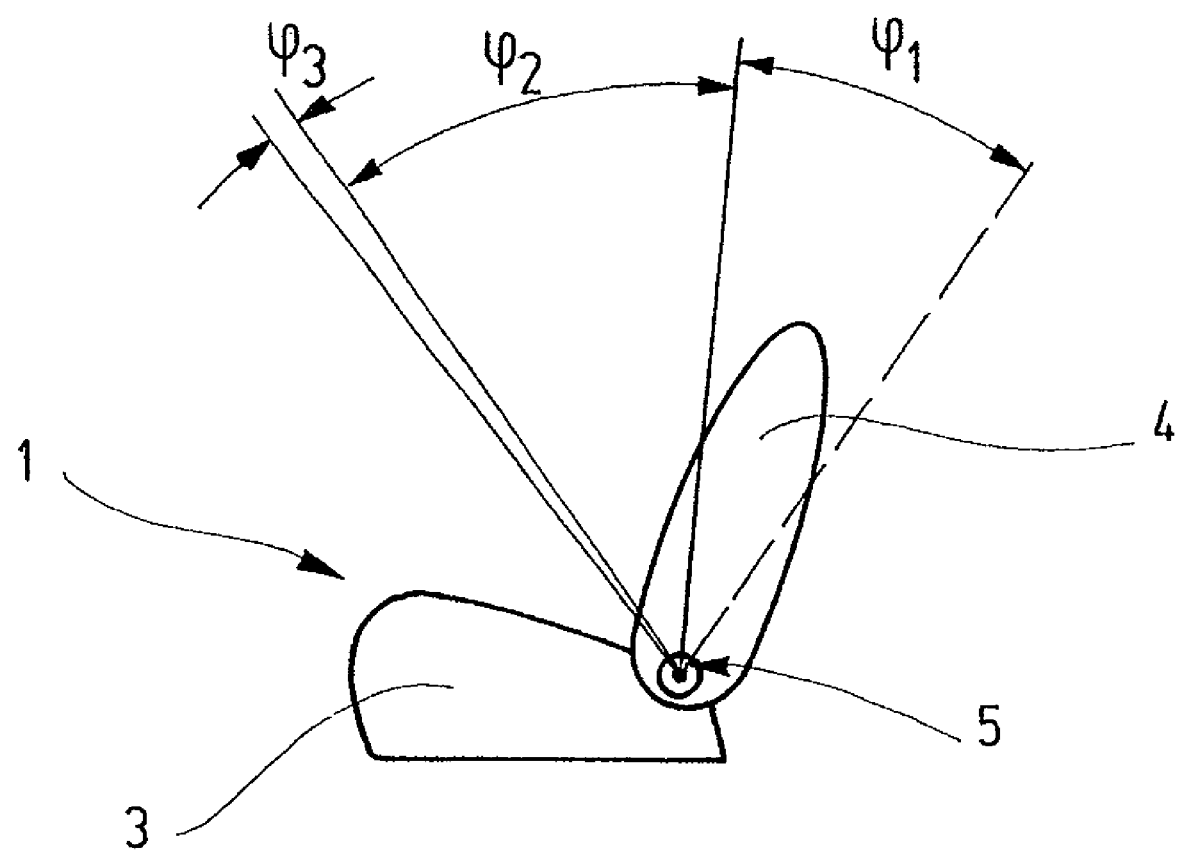
FIG. 4 shows a schematic side view of a vehicle seat.

A vehicle seat 1 of a motor vehicle has a seat part 3 and a backrest 4 which is laterally attached by way of two fittings to the seat part 3, so that the backrest 4 is pivotable relative to the seat part 3 and is lockable at different angles of inclination. The orientation of the vehicle seat 1 in the motor vehicle and its customary direction of travel, as well as the symmetry and arrangement of the fittings in the vehicle seat 1, define the directional details used in the Detailed Description section of this disclosure. The vehicle seat 1 is designed as a seat with an integral belt, i.e. the upper end of a seat belt is fastened to the backrest 4, or more specifically the upper end of the seat belt is fastened to an automatic belt device on the upper edge of the backrest 4. The forces introduced into the backrest 4 via the seat belt in the event of loading can therefore be conducted on into the seat part 3 via the fittings, which is why at least the fitting 5 on the side of the vehicle seat which is subjected to a higher load and to which the seat belt is attached is designed as a high-load fitting.

The fitting 5 is based on the same principle as the fitting described in DE 102 53 054 A1. The entire disclosure of DE 102 53 054 A1 is incorporated herein by reference. The fitting 5 is designed as a disk-shaped latching fitting. The fitting 5 has a first fitting part 7 and a second fitting part 8 which is rotatable about an axis A relative to the first fitting part 7. The fitting parts 7,8 define a construction space therebetween. A clasping ring 9 is connected to the first fitting part 7 and engages (e.g., in the manner of a tire) over the second fitting part 8, so that the second fitting part 8 is movable relative to the clasping ring 9 and the two fitting parts 7 and 8 are held together axially. In the exemplary embodiment, a damping ring 9a is arranged between the clasping ring 9 and the second fitting part 8, and the first fitting part 7 is pressed fixedly into the clasping ring 9. The first fitting part 7 and the clasping ring 9 are preferably together welded to a structural part of the vehicle seat 1. In the exemplary embodiment, the first fitting part 7 is connected to the seat part 3 and the second fitting part 8 is connected to the backrest 4. However, the converse arrangement is also possible.

A driver 10 is mounted on the second fitting part 8 in a manner such that the driver is rotatable about the axis A. The driver 10 is arranged in the center of the fitting 5. More precisely, the driver 10 is arranged in an opening of fitting part 8. The driver 10 is secured axially by a securing ring or driver cover 10a which is fastened, preferably clipped, to the driver 10 during the installation of the fitting 5. The driver 10 and driver cover 10a each have a flange which bears in each case on the outside of one of the two fitting parts 7 or 8.

An eccentric 11 which is arranged in the construction space sits on the driver 10 in a rotationally fixed manner, or at least the eccentric 11 is coupled to the driver 10 for being carrying along by it. The eccentric 11 acts on two first locking elements 13a and two second locking elements 13b which are arranged in the construction space around the eccentric 11. The locking elements 13a, 13b are offset in an alternating manner by 90° in each case with respect to one another. The locking elements 13a, 13b, on their radially outer side (with respect to the axis A), are provided with a toothing for interacting with a toothed ring 14 of the second fitting part 8, which is designed as an internal gearwheel. The fitting 5 is locked by way of the toothing of the locking elements 13a, 13b interacting with the toothed ring 14 of the second fitting part 8. The locking elements 13a and 13b are guided in the radial direction by guide segments 15 of the first fitting part 7. The second fitting part 8 rests with the toothed ring 14 on the four guide segments 15, as a result of which the second fitting part 8 is mounted on the first fitting part 7. When the fitting 5 is locked, an amount of play necessary for the operation of the fitting 5 is eliminated by a tilting of the locking elements 13a and 13b, with the first locking elements 13a and the second locking elements 13b preferably tilting in opposite directions in order to provide an overall greater strength in the event of loading. The tilting is lateral with respect to the radial direction.

A spring arrangement 17 is located in a central cutout of the first fitting part 7 and acts upon the eccentric 11 such that the eccentric presses the locking elements 13 radially outward, i.e. into the toothed ring 14, and therefore the fitting 5 is locked. The centrally arranged spring arrangement 17 comprises two individual springs which are each designed per se as a flat spiral spring, are arranged rotated with respect to each other by 180° around the axis A, and are nested one inside the other (i.e. the distances between the respective coils are selected to be of a size sufficient that a coil of the second spring comes to lie between two coils of the first spring and vice-versa, and that there is also sufficient spring deflection in each case for contraction or expansion). This spring arrangement 17 acts upon the eccentric 11 in a manner free from transverse force.

A disk cam 19 is arranged axially in the construction space between the locking elements 13 and the second fitting part 8. In the exemplary embodiment, disk cam 19 sits in a rotationally fixed manner on the eccentric 11. The disk cam 19 has two first control tracks 19a within each cutout in the disk cam 19. The disk cam 19 has a central opening, and there are two second control tracks 19b on the radially inward edge of the disk cam 19 that defines the central opening. The control tracks 19a, 19b are arranged in an alternating manner. The first control tracks 19a interact in each case with a first lug 23a of each first locking element 13a. The second control tracks 19b each interact with a second lug 23b of each second locking element 13b. In the exemplary embodiment, the lugs 23a and 23b (which are hidden from view in FIG. 1, and shown in FIGS. 2 and 3) protrude in the axial direction from the locking elements 13a and 13b. In accordance with the arrangement of the control tracks 19a and 19b, the first lugs 23a are arranged radially approximately in the center of the first locking elements 13a, whereas the second lugs 23b are arranged at that side of the second locking elements 13b which is located radially inwardly. When the driver 10 (and the eccentric 11, which is driven therewith), and the disk cam 19 are rotated counter to the force of the spring arrangement 17, the disk cam 19 pulls the locking elements 13a and 13b radially inward, i.e. out of the toothed ring 14, thereby unlocking the fitting 5.

With the adjustment of the inclination of the backrest 4, the backrest takes up various use positions suitable for seating use. In the exemplary embodiment, the use positions of the backrest 4 are located within an angular range $\phi_1$ of a seat-defined coordinate system. The angular range $\phi_1$ is bounded to the rear by stops outside the fitting 5. Access to a rear seat row is to be facilitated by way of the backrest 4 pivoting freely. For this purpose, the fittings are unlocked by way of an actuating element, and the backrest 4 is pivoted forward out of one of the use positions, so that the backrest passes over an angular range $\phi_2$ that is also referred to below as the free-pivoting angular range. The angular range $\phi_2$ forwardly adjoins the angular range $\phi_1$ of the use positions. The free-pivoting operation ends in a position which is inclined obliquely forward and is referred to below as the freely pivoted position. The freely pivoted position is located in an angular range $\phi_3$ of imperceptibly small width which forwardly adjoins the free-pivoting angular range $\phi_2$. In the exemplary embodiment, the fitting 5 can be locked again within the angular range $\phi_3$. The angular ranges $\phi_1$, $\phi_2$, $\phi_3$ of the backrest 4 correspond to certain relative angular ranges of the fitting parts 7 and 8.

The operating comfort is increased if the actuating element does not have to be held during the entire free-pivoting operation and the fittings nevertheless only lock in the freely pivoted position. For a fitting with two locking elements, an additional ring in the interior of the fitting is proposed for this purpose in DE 199 28 148 A1. When this solution is transferred to the present fitting, the solution comes to its limits if the free-pivoting angular range is to be greater than 90°.

In the fitting 5, an annular free-pivoting control element 28 is therefore provided about the axis A between the disk cam 19 and the second fitting part 8, and the free-pivoting control element 28 is connected in a rotationally fixed manner to the second fitting part 8. As shown in FIG. 1 for the rotationally fixed connection of the exemplary embodiment, a carry-along contour in the form of a cutout is provided on the outer edge of the free-pivoting control element 28, and a carry-along mating contour in the form of a radially inwardly projecting portion of material is provided on the second fitting part 8. The carry-along contour/cutout on the outer edge of the free-pivoting control element 28 interacts with the carry-along mating contour/radially inwardly projecting portion of material of the second fitting part 8. The free-pivoting control element 28 has two guide slots 29 which are curved about the axis A and are each separated from each other by a web 30. First stop tracks 31 are respectively formed within the guide slots 29 on the radially outer edge, whereas a second stop track 32 is provided on the radially inner edge of the free-pivoting control element 28. The stop tracks 31 and 32 each have at least one first subregion 31a and 32a extending farther radially outward, and at least one second subregion 31b and 32b extending father radially inward. The subregions 31a, 32a each per se are at an at least approximately constant distance (radius) from the axis A. The second stop track 32 extends over 360° and has two second subregions 32b which are offset with respect to each other by 180°, whereas the two first stop tracks 31 extend over somewhat less than 180° and each have only one second subregion 31b, with these two second subregions 31b likewise being offset with respect to each other by 180°.

The first lugs 23a of the first locking elements 13a interact not only with the disk cam 19 but in addition with a respective first stop track 31, whereas the second lugs 23b of the second locking elements 13b interact with the second stop track 32. The free-pivoting control element 28 is arranged in the second fitting part 8 in such a manner that, in the use positions of the backrest 4, the first lugs 23a are located in the first subregions 31a of the first stop track 31 and the second lugs 23b are located in the first subregion 32a of the second stop track 32. The first subregions 31a and 32a are positioned radially outward to an extent sufficient for the locking elements 13a and 13b to be able to interact with the second fitting part 8 without obstruction, i.e. to be able to engage in the toothed ring 14.

If the backrest 4 enters the free-pivoting angular range $\phi_2$ during the free-pivoting operation, the first lugs 23a pass into the second subregions 31b of the first stop track 31 and the second lugs 23b pass into the second subregions 32b of the second stop track 32. The second subregions 31b and 32b are positioned radially inward to an extent such that they act as stops for the locking elements 13a and 13b and prevent the locking elements 13a, 13b from interacting with the second fitting part 8, i.e. from engaging in the toothed ring 14. The fitting 5 cannot be locked. The second subregions 31b and 32b extend over an angular range corresponding to the free-pivoting angular range $\phi_2$. Therefore, only when the backrest 4 has reached the freely pivoted position $\phi_3$, i.e. has traversed the free-pivoting angular range $\phi_2$, do the lugs 23a and 23b pass again into the first subregions 31a and 32a such that the fitting 5 can be locked again. In the exemplary embodiment, the second subregions 31b of the first stop tracks 31 and the webs 30, which restrict the relative rotation of the fitting parts 7 and 8, are arranged so that in each of the guide slots 29 there is a short section of the first subregion 31a that is the width of a first lug 23a and defines the freely pivoted position $\phi_3$.

It will be understood by those skilled in the art that while the present invention has been discussed above with reference to an exemplary embodiment, various additions, modifications and changes can be made thereto without departing from the spirit and scope of the invention as set forth in the claims.

That which is claim:

1. A fitting for a vehicle seat, the fitting comprising:
   a first fitting part;
   a second fitting part which is rotatable about an axis relative to the first fitting part;
   a drivable eccentric mounted for rotating about the axis;
   at least four locking elements which are radially guided by the first fitting part, wherein the locking elements are for being acted upon by the eccentric so that the locking elements move radially outward to interact with the second fitting part and lock the fitting;
   a disk cam for pulling the locking elements radially inward to unlock the fitting;
   a free-pivoting control element for preventing the fitting from locking in a predetermined free-pivoting angular range corresponding to a relative angular range of the fitting parts, the free-pivoting control element comprising at least one first stop track and at least one second stop track that is offset axially and/or radially with respect to the at least one first stop track; and
   the locking elements comprising
      at least two first locking elements which interact with the at least one first stop track, and
      at least two second locking elements which interact with the at least one second stop track,
   wherein
      the first locking elements each have a first lug that protrudes axially;
      the second locking elements each have a second lug that protrudes axially;
      the first and second lugs are for interacting with the disk cam; and the first and second lugs are for respectively interacting with the at least one first stop track and the at least one second stop track.

2. The fitting as claimed in claim 1, wherein for each stop track of the at least one first stop track and the at least one second stop track and a respective locking element of the locking elements:
the stop track comprises a first subregion for allowing the locking element to interact with the second fitting part for the locking of the fitting, and
the stop track comprises a second subregion for preventing the locking element from interacting with the second fitting part for the locking of the fitting, and the second subregion extends over an angular range corresponding to the free-pivoting angular range.

3. The fitting as claimed in claim 2, wherein:
the first subregion
extends farther radially outward than the second subregion, and
extends at least approximately at a constant radial distance from the axis;
the second subregion
extends farther radially inward than the first subregion, and
extends at least approximately at a constant radial distance from the axis.

4. The fitting as claimed in claim 1, wherein:
the free-pivoting control element comprises a guide slot; and
the at least one first stop track comprises a first stop track that is defined by an edge of the guide slot.

5. The fitting as claimed in claim 1, wherein:
the free-pivoting control element comprises first and second guide slots;
the at least one first stop track comprises
a first stop track that is defined by an edge of the first guide slot, and
another first stop track that is defined by an edge of the second guide slot;
the free-pivoting control element comprises webs; and
the guide slots are separated from one another by the webs.

6. The fitting as claimed in claim 5, wherein:
the free-pivoting control element is annular and comprises a radially inner edge; and
the at least one second stop track is defined by the radially inner edge.

7. The fitting as claimed in claim 1, wherein:
the free-pivoting control element is annular and comprises a radially inner edge; and
the at least one second stop track is defined by the radially inner edge.

8. The fitting as claimed in claim 1, wherein the first lugs are positioned:
farther radially outward than the second lugs, or
farther radially inward than the second lugs.

9. The fitting as claimed in claim 1, wherein the disk cam comprises:
first control tracks for respectively interacting with the first lugs; and
second control tracks for respectively interacting with the second lugs.

10. The fitting as claimed in claim 9, wherein:
the disk cam comprises cutouts that respectively define the first control tracks; and
the disk cam comprises a radially inner edge that defines the second control tracks.

11. The fitting as claimed in claim 9, wherein the disk cam includes:
a radially inner edge that defines a central opening of the disk cam, and the radially inner edge comprises the second control tracks of the disk cam; and
other edges that respectively define cut out spaces of the disk cam, and the other edges respectively comprise the first control tracks.

12. The fitting as claimed in claim 1 in combination with the vehicle seat, wherein the vehicle seat comprises a seat part and a backrest, and the fitting is connected between the seat part and the backrest for both:
allowing adjusting of the backrest's inclination with respect to the seat part, and
allowing the backrest to be pivoted freely with respect to the seat part.

13. The fitting as claimed in claim 1, wherein each of the at least two second locking elements is adjacent to the first locking elements.

14. The fitting as claimed in claim 1, wherein the free-pivoting control element is fixedly connected to the second fitting part for rotating with the second fitting part relative to the first fitting part.

15. The fitting as claimed in claim 1, wherein:
the free-pivoting control element comprises first and second guide slots; and
the at least one first stop track comprises
a first stop track that is defined by an edge of the first guide slot, and
another first stop track that is defined by an edge of the second guide slot.

16. The fitting as claimed in claim 1, wherein:
the first lugs are positioned farther radially outward than the second lugs; and
the second lugs are positioned farther radially inward than the first lugs.

17. The fitting as claimed in claim 16, wherein:
the first lugs are positioned approximately centrally on the first locking elements, respectively; and
the second lugs are positioned proximate radially inner sides of the second locking elements, respectively.

18. A fitting for a vehicle seat, the fitting comprising:
a first fitting part;
a second fitting part which is rotatable about an axis relative to the first fitting part;
a drivable eccentric mounted for rotating about the axis;
at least four locking elements which are radially guided by the first fitting part, wherein the locking elements are for being acted upon by the eccentric so that the locking elements move radially outward to interact with the second fitting part and lock the fitting;
a rotatably mounted disk cam for pulling the locking elements radially inward to unlock the fitting;
a free-pivoting control element mounted for rotating with the second fitting part relative to the first fitting part, the free-pivoting control element comprising first stop tracks and second stop tracks, and the second stop tracks being radially offset with respect to the first stop tracks;
the locking elements comprising at least two first locking elements and at least two second locking elements; and
the first and second locking elements respectively interacting with the first and second stop tracks for preventing the fitting from locking in a predetermined free-pivoting angular range corresponding to a relative angular range of the fitting parts, wherein
- the first locking elements each have a first lug that protrudes axially;
- the second locking elements each have a second lug that protrudes axially;
- the first and second lugs are for interacting with the disk cam; and
- the first and second lugs are for respectively interacting with the first and second stop tracks.

19. The fitting as claimed in claim 18, wherein for each stop track of the first and second stop tracks and a respective locking element of the locking elements:
- the stop track comprises a first subregion for allowing the locking element to interact with the second fitting part for the locking of the fitting; and
- the stop track comprises a second subregion that extends farther radially inward than the first subregion so that the second subregion is for preventing the locking element from interacting with the second fitting part for the locking of the fitting, and the second subregion extends over an angular range corresponding to the free-pivoting angular range.

20. The fitting as claimed in claim 18, wherein:
- the free-pivoting control element comprises a radially inner edge that extends around and defines a central opening of the free-pivoting control element; and
- the second stop tracks are defined by the radially inner edge.

* * * * *